United States Patent [19]

Gordon

[11] Patent Number: 5,038,444

[45] Date of Patent: Aug. 13, 1991

[54] MOLDING SUPPORT ASSEMBLY

[75] Inventor: Gary G. Gordon, Milford, Mich.

[73] Assignee: Molmec-Raymond Fastener Company, Rochester Hills, Mich.

[21] Appl. No.: 451,995

[22] Filed: Dec. 18, 1989

[30] Foreign Application Priority Data

Jan. 27, 1989 [DE] Fed. Rep. of Germany ....... 3902399

[51] Int. Cl.$^5$ ................................................ A44B 1/02
[52] U.S. Cl. .......................................... 24/292; 24/297
[58] Field of Search .................. 24/292, 297, 289, 293

[56] References Cited

U.S. PATENT DOCUMENTS

| 2,655,239 | 10/1953 | Kenlock | 24/289 X |
| 3,037,596 | 6/1962 | Fordyce | 24/297 X |
| 3,487,420 | 12/1969 | Herr et al. | 24/293 X |
| 3,897,967 | 8/1975 | Barenyi | 24/297 X |

FOREIGN PATENT DOCUMENTS

| 271725 | 4/1964 | Australia | 24/297 |
| 1107029 | 5/1961 | Fed. Rep. of Germany | 24/297 |

Primary Examiner—Laurie K. Cranmer
Attorney, Agent, or Firm—Reising, Ethington, Barnard, Perry & Milton

[57] ABSTRACT

A molding support assembly for mounting a molding strip upon a base structure such as an automobile body, wherein the assembly includes a pair of spaced fasteners mounted upon a support member in such a way so at least one fastener is longitudinally adjustable relative to the other to permit adjustment for misalignment between mounting holes in the base structure.

3 Claims, 1 Drawing Sheet

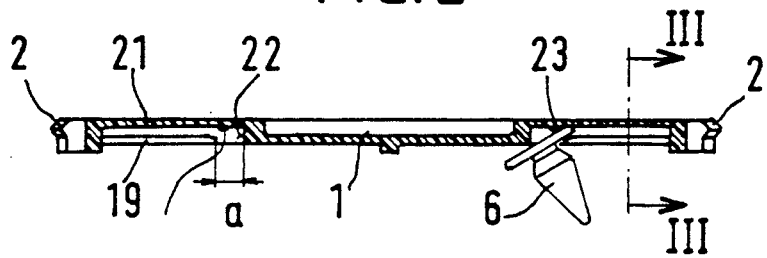
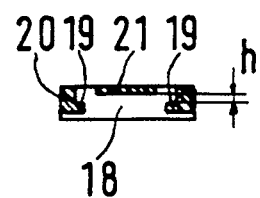
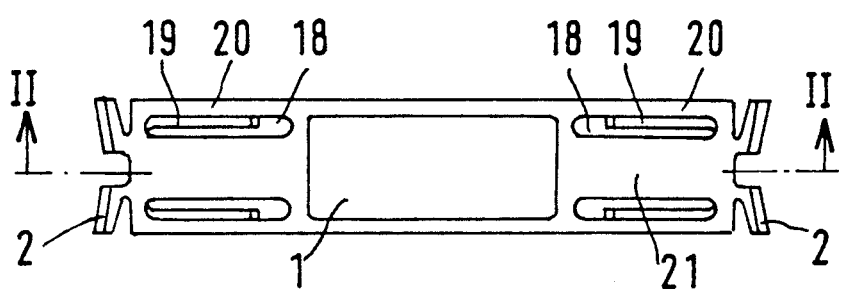
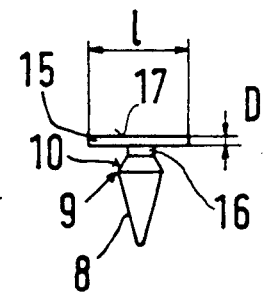
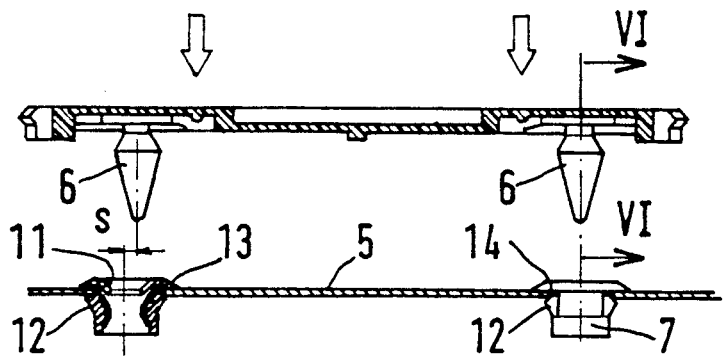
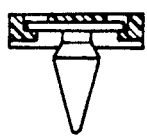
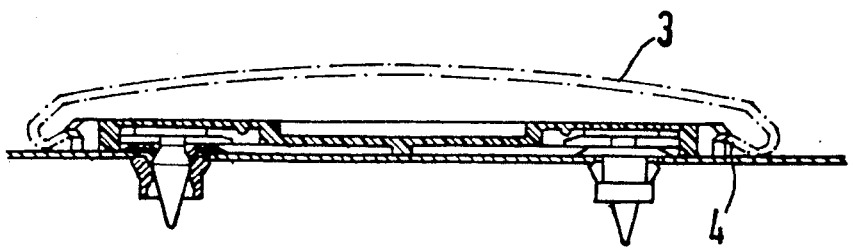

MOLDING SUPPORT ASSEMBLY

FIELD OF INVENTION

The invention pertains to a molding support made of hard elastic plastic for the attachment of lining strips or moldings to base walls, such as, e.g., car body sheets of motor vehicles and especially intends the creation of a molding support for wide moldings, which are used, for example, on buses or trucks.

With regard to the desired attachment of wider moldings, it is the task of the invention to form the molding support such that the corresponding wide intermediate piece, on the one hand, is anchored transversely to the molding direction and is protected against twisting, and on the other hand, even in not exactly aligning attachment holes, a faultless assembly of the molding on the supports is made possible, in which case the molding supports are first attached to the car body and then the moldings are pressed on the supports.

To solve this task, it is suggested to arrange two support pegs at a distance from one another in the case of a molding support of the above-described type in the oblong intermediate piece aligned transverse to the lengthwise direction of the molding, from which at least one support peg is directed movably in the lengthwise direction of the intermediate piece. By this means, not only is a twistproof attachment of the intermediate part on the base wall obtained, but simultaneously the attachment sites are pressed as close as possible to the support strips of the intermediate piece, such that the intermediate piece itself does not have to contain any large support forces and therefore can be formed correspondingly flat and light. It is also possible by means of the movable arrangement of the support peg to compensate for slight deviations in the distance between the upper and the lower attachment points in the intermediate piece. An even better compensation—also in the total alignment of the attachment point—is given accordingly to another characteristic of the invention, when both support pegs are directed movably in the intermediate piece.

In the subclaims, additional development characteristics of the invention are indicated, which contribute to the suitably functioning design of the molding support—even in the aspect of a cost-favorable production of the recess—and aim at, in other respects, an assembly-friendly embedding of the support peg in the intermediate piece.

BACKGROUND OF THE INVENTION

In the case, the invention proceeds from a molding support known from U.S. Pat. No. 3,063,114, in which the intermediate piece is made integral with the support peg. This molding support can only be used for relatively narrow molding, in which case the supports are first inserted in the hollow molding from the side and then are mounted together with the molding. Furthermore, it is important for a faultless assembly that the attachment holes align exactly in the car body sheet, since the supports are fixed in the moldings in the transverse direction.

Another related patent known to the inventor is U.S. Pat. No. 3,606,721 Meyer. While providing means for adjustably mounting a molding assembly upon a base structure such as a vehicle, Meyer requires his supporting fasteners to be fixed to the base structure and provides a plurality of slotted supports which are adjustable relative to the fixed fasteners.

BRIEF DESCRIPTION OF DRAWINGS

A preferred example embodiment of the invention is represented in the drawing and is explained in detail below.

FIG. 1 shows a molding support with two recesses for movable support pegs in top view.

FIG. 2 shows a longitudinal section through the molding support according to line II—II in FIG. 1 when inserted a support leg.

FIG. 3 shows a cross section through the recess of the molding support according to line III—III in FIG. 2.

FIG. 4 shows a support peg in front view.

FIG. 5 shows a molding support with two movable support pegs above a base wall with mounted attachable linings before assembly.

FIG. 6 shows a cross section through the molding support according to line VI—VI in FIG. 5 and FIG. 7 shows the molding support in longitudinal section of FIG. 5 after assembly.

BEST MODE FOR CARRYING OUT THE INVENTION

The molding support represented in the figures essentially consists of an oblong intermediate piece 1, which has on both ends two elastic support borders 2 capable of being pressed together, which serve for the uptake of a lining strip or molding 3 indicated in dash-dot lines in FIG. 7. In a known manner, these are pressed onto the intermediate piece 1, when the molding support is attached to the base wall 5 (FIG. 7). In this case, the support borders 2 grip the molding 3 from behind on its outer edges 4 which are formed towards the inside.

On the lower side of the intermediate piece 1, two support pegs 6 are arranged at a distance from one another, and namely, very close to the support borders 2, for the twistproof anchoring of the molding support on the base wall 5. The support pegs 6 are attached to the base wall 5 by means of attachable linings 7, in which case the support pegs 6 snap into the attachable linings 7 like a snap fastener (FIGS. 5 and 6).

For this purpose, the support peg 6 is provided with an entering point 8, a thickened area 9 and a conically tapering catch area 10 connected to it (FIG. 4), while the accompanying attachable lining 7 has a catch ring 11 narrowing in a funnel-shaped manner. When pressing in the support peg 6, this ring expands and contracts again after the passage of the thickened area 9, in which case the catch ring 11 is supported on the catch area 10. For the attachment of the attachable lining 7 in a hole 14 of the base wall 5, the lining 7 additionally possesses two struts 12 protruding diagonally towards the outside and a flange 13, which lies on the edge of the hole after inserting the attachable lining 7, while the struts 12 are supported on the rear side of the edge of the hole (FIG. 5).

For the movable embedding of the support peg 6 in the intermediate piece 1 (see FIG. 5), the support peg 6 possesses an essentially rectangular top plate 15, which is formed above a cylindrical collar 16 to the conical catch area 10 of the support peg 6. Accordingly, two recesses are provided in the intermediate piece 1, the side walls 20 of which run transverse to the molding direction and are at a distance from one another, which is somewhat greater than the length "L" of the longitudinal sides of the top plate 15.

On the lower edge of the side walls 20 turned towards the base wall 5, edge strips 19, bent to the center of the recess 18, are formed, which form an L-shaped cross section with the side walls 20.

The recess 18 is spanned by a cross piece 21 parallel to the edge strips 19, which closes with the upper edge of the side walls 20 at the same height. In this case, the horizontal distance "h" between the edge strips 19 and the crosspiece 21 is as small as or only slightly smaller than the thickness "D" of the top plate 15, such that the mounted top plate 15 is supported from the crosspiece and within a slot 24 defined by strips 19, side wall 20 and crosspiece 21.

To facilitate the insertion of the top plate 15 into the recess 18, it is provided that the edge strips 19 end at a suitable distance "a" from the inner transverse wall 22 of the recess 18. As is evident from FIG. 2, the top plate 15 is inserted diagonally above the end of the edge strips 19 under the transverse wall 22, in which case the crosspiece 21, somewhat springy, slackens. A stop rib 23 is formed on the lower side of the crosspiece 21 somewhat above the end of the edge strips 19. This provides for the fact that the top plate 15, once inserted, cannot slide out again.

The function of the molding support according to the invention is clearly represented in FIGS. 5 to 7. In FIG. 5, the molding support provided with the movable support peg 6 is close above the base wall 5. The entering point 8 of the right support peg 6 is exactly directed at the opening of the funnel-shaped catch ring 11 of the attachable lining 7, while the point 8 of the left support peg 6 lies shifted to it by the amount "s." By pressing on the molding support, the top plate 15 slides into the recess 18 of the intermediate piece 1 towards the left, until the point 8 is also directed in the center of the catch ring 11 and thus can be easily inserted into the assembly position shown in FIG. 7.

In the attaching assembly of the molding 3, the advantage of the molding support according to the invention is again clear, when the support borders 2 do not exactly align and must be aligned corresponding to the outer edges 4 of the molding 3. For this, it is especially appropriate, if both support pegs 6 are arranged movably in the intermediate piece 1, so as to be able to still additionally compensate for inaccuracies in the alignment of the attachment holes 14.

It is apparent that other modifications may be made within the intended scope of the invention as set forth in the hereinafter appended claims.

What is claimed is:

1. A molding support of the type for mounting a molding upon a base structure (5), said support comprising an elongated plate (1) having resilient means (2) at opposite ends thereof to support said molding thereupon, a pair of fasteners (6) adapted respectively to be inserted and snappingly retained within a pair of aligned and spaced openings (14) in said base structure, a pair of longitudinally aligned recesses (18) formed in said plate and respectively disposed proximate said resilient means, said recesses including transversely spaced edge strips (19) defining a slot (24), said elongated plate including a resilient crosspiece (21) disposed above said slot and intermediate said edge strips, each fastener including a top plate portion (15) insertable within said slot to abuttingly and frictionally engage said crosspiece whereby said fastener may be longitudinally adjustable within said slot.

2. A molding support of the type set forth in claim 1 wherein the transversely spaced edge strips (19) are spaced below and laterally outwardly of the resilient crosspiece (21).

3. A molding support of the type set forth in claim 2 wherein said plate (1) includes transverse walls (22) longitudinally spaced from adjacent ends of said edge strips (19), the top plate portion (15) of the fastener being insertable between a transverse wall, the adjacent ends of said edge strips and the crosspiece to enter the associated recess.

* * * * *